United States Patent
Raguin et al.

(10) Patent No.: US 10,715,005 B2
(45) Date of Patent: Jul. 14, 2020

(54) WELDED STATOR FRAME FOR AN ELECTRIC MOTOR AND ASSOCIATED MANUFACTURING PROCESS

(71) Applicant: Alstom Transport Technologies, Saint-Ouen (FR)

(72) Inventors: Bruno Raguin, Ornans (FR); Jean-Pierre Lombard, Miserey-Salines (FR); Gaëtan Trimaille, Besancon (FR)

(73) Assignee: Alstom Transport Technologies, Saint-Ouen (FR)

( * ) Notice: Subject to any disclaimer, the term of this patent is extended or adjusted under 35 U.S.C. 154(b) by 390 days.

(21) Appl. No.: 15/649,196

(22) Filed: Jul. 13, 2017

(65) Prior Publication Data
US 2018/0026490 A1 Jan. 25, 2018

(30) Foreign Application Priority Data
Jul. 22, 2016 (FR) ..................... 16 57053

(51) Int. Cl.
| H02K 5/06 | (2006.01) |
| H02K 15/14 | (2006.01) |
| H02K 5/04 | (2006.01) |
| H02K 5/15 | (2006.01) |
| H02K 1/18 | (2006.01) |

(52) U.S. Cl.
CPC ............ *H02K 5/06* (2013.01); *H02K 1/185* (2013.01); *H02K 5/04* (2013.01); *H02K 5/15* (2013.01); *H02K 15/14* (2013.01)

(58) Field of Classification Search
CPC .......... H02K 15/14; H02K 1/185; H02K 5/04; H02K 5/06; H02K 5/15

USPC ................... 310/89, 154.41–154.49
See application file for complete search history.

(56) References Cited

U.S. PATENT DOCUMENTS

| 3,844,024 | A | 10/1974 | Otto |
| 3,858,067 | A | 12/1974 | Otto |
| 7,202,587 | B2 * | 4/2007 | Sargeant ............... H02K 1/185 |
| | | | 310/418 |
| 9,263,921 | B2 * | 2/2016 | Tanavde ................ H02K 1/16 |
| 10,141,797 | B2 * | 11/2018 | Qin ........................ H02K 1/16 |
| 10,530,212 | B2 * | 1/2020 | Raguin .................. H02K 5/04 |
| 2011/0031827 | A1 * | 2/2011 | Gennesseaux ......... H02K 7/025 |
| | | | 310/74 |
| 2013/0109526 | A1 | 5/2013 | Oishi |

(Continued)

FOREIGN PATENT DOCUMENTS

| CN | 102052378 A | 5/2011 |
| DE | 202004002527 U1 | 12/2004 |

(Continued)

OTHER PUBLICATIONS

International Search Report dated Apr. 7, 2017, issued in corresponding French Application No. 1657053.

(Continued)

*Primary Examiner* — Bernard Rojas
(74) *Attorney, Agent, or Firm* — Troutman Sanders LLP

(57) ABSTRACT

The invention relates to a motor stator frame having two plates in cast iron; at least one steel bar connecting both plates, the bar having two ends each attached to one of the plates; and each plate in cast iron has at least one orifice receiving an insert in steel, the end of the bar attached to the plate being welded to said insert.

12 Claims, 2 Drawing Sheets

(56) References Cited

U.S. PATENT DOCUMENTS

| | | | |
|---|---|---|---|
| 2013/0193784 A1* | 8/2013 | Zheng | H02K 5/15 310/51 |
| 2014/0367971 A1 | 12/2014 | Tanavde et al. | |
| 2018/0026491 A1* | 1/2018 | Raguin | H02K 5/06 310/418 |

FOREIGN PATENT DOCUMENTS

| | | |
|---|---|---|
| JP | 10-225042 A | 8/1998 |
| WO | 2015120093 A1 | 8/2015 |

OTHER PUBLICATIONS

European Search Report issued in corresponding European Patent Application No. 17 181 698.6 dated Dec. 1, 2017.

* cited by examiner

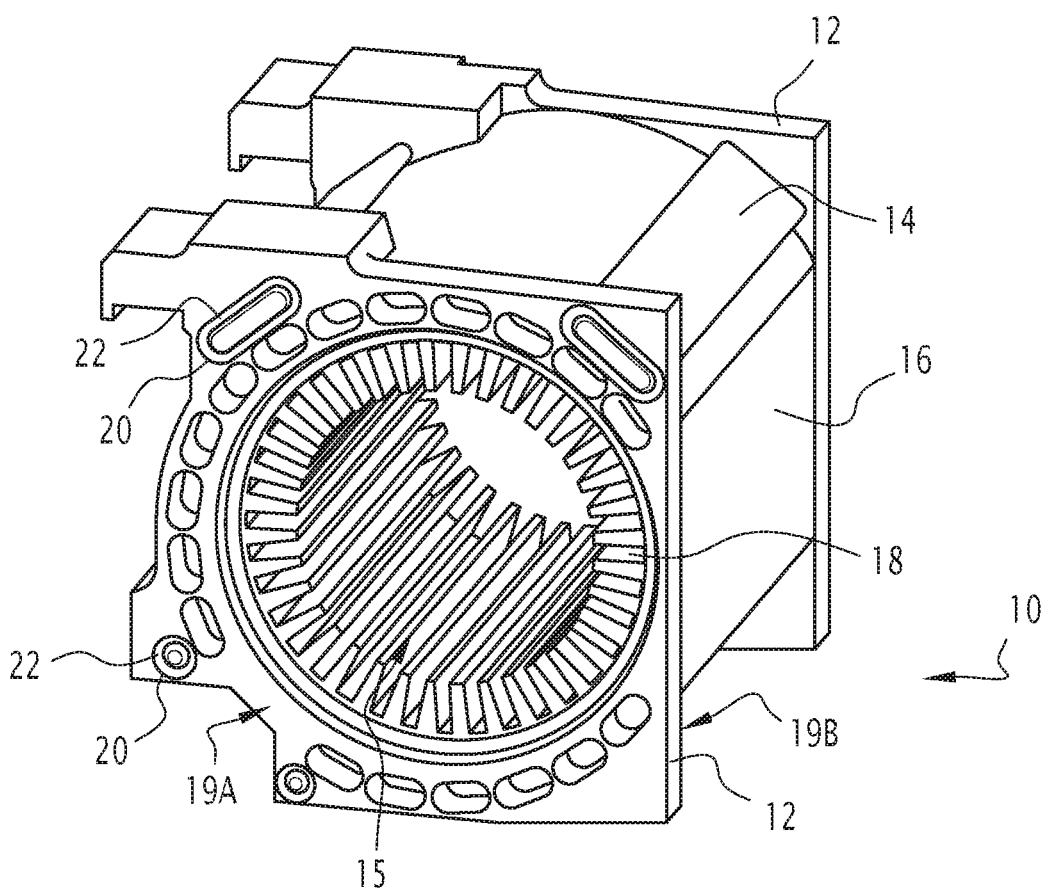
FIG.1
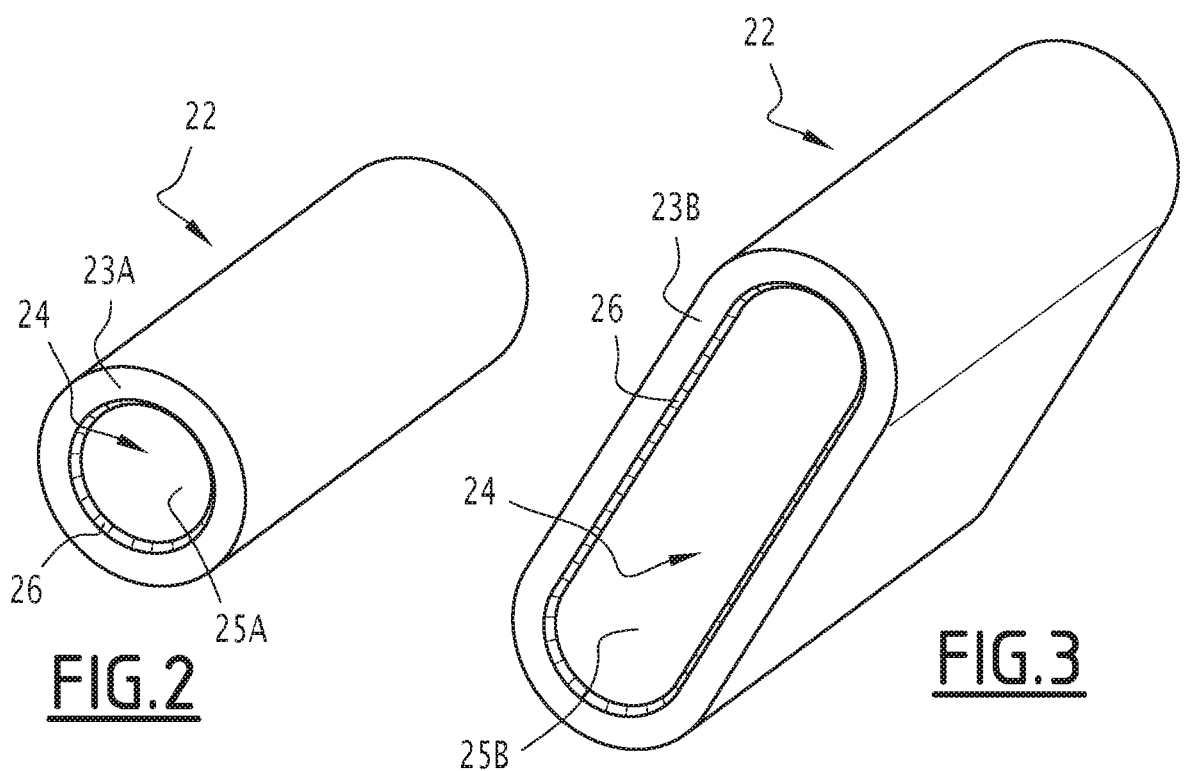
FIG.2
FIG.3

WELDED STATOR FRAME FOR AN ELECTRIC MOTOR AND ASSOCIATED MANUFACTURING PROCESS

CROSS REFERENCE TO RELATED APPLICATIONS

The present application claims priority to French Application No. FR 16 57053 filed Jul. 22, 2016. This application is incorporated herein by reference in its entirety.

FIELD OF THE INVENTION

The present invention relates to a welded stator frame of a motor including two plates in cast iron; at least one steel bar connecting both plates, the bar having two ends each attached to one of the plates. This stator frame is intended to receive a rotor of an electric motor, notably an electric motor participating in the propulsion of a railway vehicle.

BACKGROUND

A railway vehicle generally includes several motors of this type, positioned on the bogies and driving the wheels. To do this, the electric motors transform into a rotary movement electric power produced by the generator of the vehicle or directly provided from a power supply cable.

These motors generally consist of a rotary portion, the rotor, and a fixed portion, the stator, attached in a stator frame which plays a role for protecting and insulating the motor and receives a circuit for cooling the motor.

The frame is a metal casing, generally in an iron alloy for maximum mechanical strength, for example in cast iron or in steel. Several methods for manufacturing such a motor frame are known.

A first method consists of molding the frame in a single part, generally in cast iron, which has advantages notably in terms of cost. Further, a frame in a single piece is more rigid and solid. However, the thereby obtained frame is heavy and bulky.

In order to reduce the mass of the frame, it is known how to use a structure of several parts welded together, notably comprising two end plates connected with parallel bars. In order to compensate for the lower resistance of such a structure, steel is generally used for all the parts, which gives the possibility of welding the parts with each other, but substantially increasing the cost of the manufacturing of the frame. Further, a frame consisting of several welded parts may be subject to distortions under the effect of internal stresses generated by the cooling of the welding areas. These distortions may be reflected on the stator, which may be detrimental to proper operation of the electric motor by forming hot spots or a magnetic unbalance.

An object of the invention is to provide a motor stator frame which is more resistant to distortions and less expensive, while having a reduced bulkiness.

SUMMARY

For this purpose, the invention relates to a motor frame of the aforementioned type, characterized in that each plate in cast iron has at least one orifice receiving a steel insert, the end of the bar attached to the plate being welded to said insert.

Such a frame has advantages in terms of bulkiness relatively to the moulded cast iron frame, not being made in a single piece and thus having a less massive structure. The frame is also expensive than a frame made from steel parts welded together, since the most massive parts like the plates are made in cast iron.

According to particular embodiments, the frame of the motor according to the invention has one or several of the following characteristics, taken individually or according to any technically possible combination:
- the orifice(s) receiving the inserts cross the plates, the inserts having a central through-conduit, able to receive the bar;
- each end of each bar has a chamfered edge and each central conduit of each insert has at least one chamfered edge;
- the chamfered edge of each central conduit of each insert is located on the side of an outer face of the plate, and forms with the chamfered edge of the end of the bar a notch in which is made a weld connecting each end of each steel bar to the insert which receives it;
- welds connecting the ends of each bar to the inserts are substantially planar and the inserts and the ends of the bars are flushed with the outer faces of the plates; and
- the ends of each bar have threaded apertures, capable of receiving the screws for attaching end flanges onto the plates.

The invention also relates to a method for manufacturing a motor stator frame, having the following steps:
- providing two plates in cast iron, having an inner face and an outer face, and through orifices receiving steel inserts;
- providing at least one steel bar; and
- welding the ends of each bar to one of the inserts of each of the plates.

According to particular embodiments, the method according to the invention comprises the following characteristics, taken individually or according to any technically possible combination:
- the inserts have a central through-conduit, and the method comprises a step for inserting the ends of the bars into the central conduits of the inserts, without the end jutting out from the outer face of the plate;
- the ends of the bars have chamfered edges and the central conduits of the inserts have a chamfered edge located on the side of the outer face of the plate, the chamfered edges and the chamfered edges forming a notch having a V-section, a weld binding each end of each bar to the insert which receives it, being made in said notch; and
- the method comprises a step for piercing a threaded aperture in each end of each bar and a step for leveling the welds at the outer faces of the plates, by removing the excess of material jutting out from the plates.

BRIEF DESCRIPTION OF THE DRAWINGS

The invention will be better understood upon reading the description which follows, exclusively given as an example and made with reference to the appended drawings, wherein:

FIG. 1 is a perspective view of a motor frame according to the invention;

FIG. 2 illustrates a first insert of the motor frame of FIG. 1;

FIG. 3 illustrates a second insert of the motor frame;

DETAILED DESCRIPTION

Figure 4:
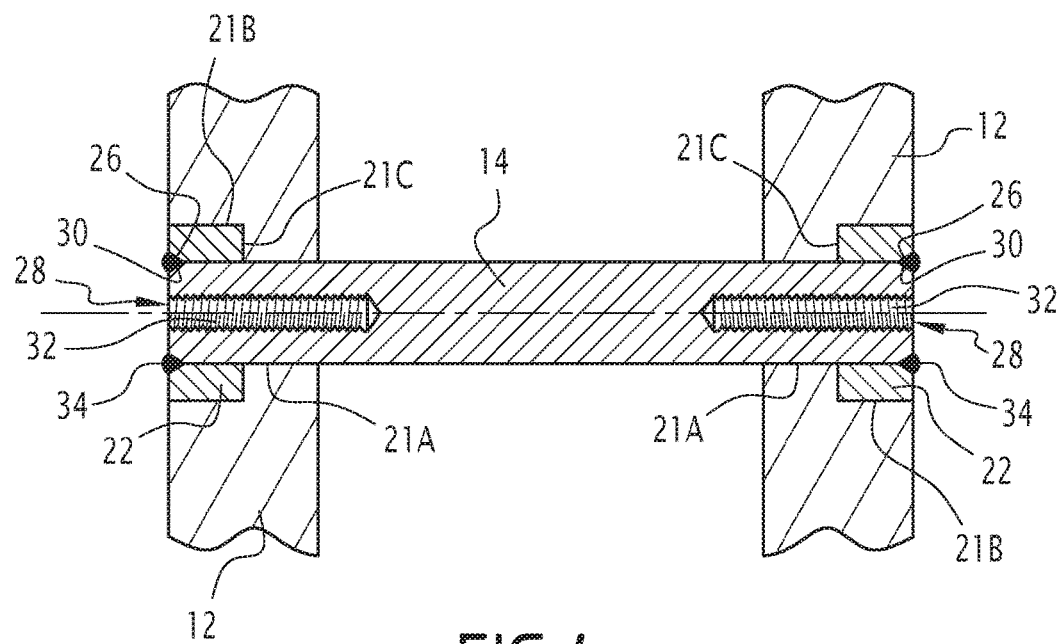
FIG. 4 is a sectional view of a bar connecting the plates of the motor frame.

A motor stator frame 10 illustrated in FIG. 1 includes two plates 12 substantially parallel and at least one bar 14 connecting both plates 12.

Both plates 12 further have a central aperture 15 for example circular, allowing insertion of a rotor into the frame 10.

Advantageously, the frame 10 comprises side walls 16 assembled by clamping between both plates 12 and able to contain and protect an electric motor stator 18.

The plates 12 are molded in cast iron and are substantially planar and have an inner face 19B and an outer face 19A. Both plates 12 further include at least one through-orifice 20, pierced in the plate 12.

By through-orifice, is meant that the orifice 20 is open at both of its ends and opens into the inner face 19B and into the outer face 19A of the plate 12.

According to a first embodiment, the orifice 20 includes an inner segment 21A of the same section as the bar 14 received by the orifice 20 and an outer segment 21B with a greater section than the segment 21A. The inner segment 21A and the outer segment 21B are connected through a transverse face 21C, perpendicular to an axis of the orifice 20.

Each orifice 20 receives an insert 22, in steel, for attachment of the bar 14.

The outer segment 21B of the orifice 20 is used as a seat for the insert 22, which comes to rest against the transverse face 21C.

The insert 22 is a pin in steel with a suitable shape for its insertion into an orifice 20 of the cast iron plate 12, the outer contour of the insert 22 mating the inner contour of the outer segment 21B.

Thus, according to the embodiment illustrated in FIGS. 1 to 3, the insert 22 has either a circular crown section corresponding to a circular section 23A of the bar 14, as illustrated in FIG. 2, or an oblong crown section, corresponding to an oblong section 23B of the bar 14, as illustrated in FIG. 3.

The length of the insert 22 is equal to the length of the outer segment 21B, so less than the thickness of the plate 12, i.e. less than the distance between the inner face 19B and the outer face 19A of the plate 12. For example, the length of the insert 22 is equal to half of the thickness of the plate 12.

The insert 22 further has a central through-conduit 24 receiving a steel bar 14. The through-conduit 24 either has a circular section 25A in the case when the insert 22 is inserted into an orifice 20 with a circular section, like the insert 22 illustrated in FIG. 2, or has an oblong section, in the case when the insert 22 is inserted into an orifice 20 with an oblong section, like the insert 22 illustrated in FIG. 3.

At least one of the edges delimiting the inside of the central conduit 24 is a chamfered edge 26. By chamfered, is meant that the edge 26 is drawn down and forms a planar surface connecting both faces adjacent to the edge 26 and forms with both of these faces complementary angles comprised between 0 and 90°, for example equal to 45°. Advantageously, the chamfered edge 26 extends in the plane of the outer face 19A of the plate 12 in which is found the insert 22. According to other embodiments not shown, the chamfered edge 26 extends in the plane of the inner face 19B of the plate 12 containing the insert 22, or else further both of the edges delimiting the central conduit 24 are chamfered.

The bar 14 is of the drawer type, in steel, and has a circular section mating the central conduit 24 of circular section 25A of the insert 22 illustrated in FIG. 2, i.e. an oblong section, mating the central conduit 24 of similar section 25B, illustrated in FIG. 3.

The bar 14 has at both of its ends 28 faces for which the edges 30 are chamfered. By chamfered, is meant that the edge 30 is drawn down and forms a planar surface connecting both faces adjacent to the edge 30 and forms with both of these faces complementary angles comprised between 0 and 90°.

Each end 28 of the bar 14 is engaged into the central conduit 24 of an insert 22, as illustrated in FIG. 4. Advantageously, the end 28 of the bar 14 is in the plane of the outer face 19A of the plate 12, In the advantageous case where the chamfered edge 26 of the central conduit 24 of the insert 22 is located in the plane of the outer face 19A of the plate 12, the chamfered edge 26 and the chamfered edge 30 of the bar 14 cooperate in order to form a notch 31 having a V-shaped section, as illustrated in FIG. 4.

Advantageously, each end 28 of at least one of the bars 14 has a threaded aperture 32 pierced in the bar 14. This threaded aperture 32 is able to receive a screw for attaching an end flange closing the circular aperture of the plate 12 and thereby protecting the rotor contained in the frame 10.

The bar 14 is maintained engaged into the insert 22 by a weld 34. The weld 34 is a «V-shaped» weld filling the notch 31 comprised between the chamfered edge 26 of the central conduit 24 of the insert 22 and the chamfered edge 30 of the end 28 of the bar 14, as illustrated in FIG. 5.

Figures 5, 6:
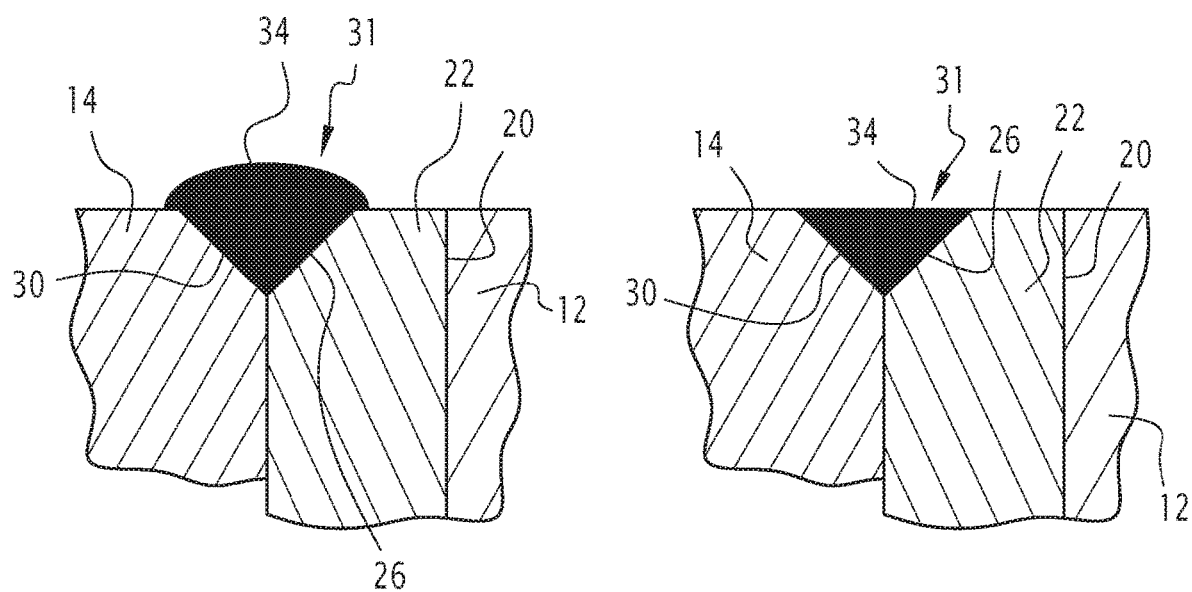
FIG. 5 is a sectional view of a weld of a bar to an insert.
FIG. 6 is a sectional illustration of the weld after leveling.

Advantageously, the weld 34 is leveled in order to have a flat profile flushed with the surface formed by the end 28 of the bar 14, the insert 22 and the plate 12, as illustrated in FIG. 6.

As the notch 31 is located on the outer face, the weld 34 is positioned on an outer face of the plate in cast iron 12, which reduces the risks of distortion of the frame 10 during cooling. This case also simplifies the welding method, by allowing better access to the relevant area from the outside.

A method for manufacturing the frame 10 according to the embodiment of FIG. 1 will now be described.

This method includes the preliminary following steps:
moulding two plates 12 in cast iron, each having an inner face 19B and an outer face 19A;
piercing at least one orifice 20 in the plates 12, the orifice 20 including an inner segment 21A and an outer segment 21B, connected through a transverse face 21C;
providing a steel insert 22 with a shape adapted for each orifice 20, having a central conduit 24 having at least one chamfered edge 26;
introducing the insert 22 into the outer segment 21B of the orifice 20, supported on the transverse face 21C, the chamfered edge 26 being oriented towards the outer face 19A of the plate 22;
providing at least one bar 14 in steel having two ends 28 with chamfered edges 30.

The method then comprises a step for introducing each end 28 of each bar 14 into the central conduit 24 of one of the inserts 22. The end 28 of each bar is aligned with the outer face 19A of the plate 12, so that the frame 10 has an external planar surface.

The bars 14 are then attached to the inserts 22 by a weld 34, made in the «V-shaped» notch 31 formed by the chamfered edges 26 of the central conduits 24 of the inserts 22 and the chamfered edges 30 of the ends 28 of the bars 14.

The outer faces 19A of the plates 12 are then flattened by leveling the welds 34, i.e. by removing the excess material for obtaining a flat profile.

The method finally includes a step for piercing a threaded aperture 32 in each end 28 of at least one of the bars 14, the threaded aperture 32 being able to subsequently receive a screw for attachment of an end flange.

The frame 10 and the manufacturing method described above may be modified while remaining compliant with the invention.

The shapes of the orifices 20, of the inserts 22 and of the bars 14 may also vary.

For example, according to another embodiment, the orifices 20 may include a single segment with a constant section, and the inserts 22 may have a shoulder at one end, located on an external surface, able to be supported against the outer face 19A of the plate 12. Advantageously, the outer face 19A may have a counterbore adapted for containing the shoulder of the insert 22.

The frame according to the invention has notable advantages, in terms of cost since the major portion of its structure is made in relatively inexpensive cast iron, in terms of lightweight since it has a structure consisting of two plates connected by ties and not moulded in a single massive part, and finally in terms of resistance to cooling distortions of the welds.

The invention claimed is:

1. A motor stator frame comprising:
   two plates in cast iron;
   at least one bar in steel connecting both plates, the bar having two ends each attached to one of the plates;
   wherein each plate in cast iron has at least one orifice receiving an insert in steel, the end of the bar attached to the plate being welded to said insert, and a weld maintaining said end of the bar engaged into said insert.

2. The frame according to claim 1, wherein the orifices receiving the inserts cross the plates, the inserts having a central through-conduit able to receive the bar.

3. The frame according to claim 2, wherein each end of each bar has a chamfered edge and wherein each central conduit of each insert has at least one chamfered edge.

4. The frame according to claim 3, wherein the chamfered edge of each central conduit of each insert is located on the side of an outer face of the plate, and forms with the chamfered edge of the end of the bar a notch in which is made a weld connecting each end of each bar in steel to the insert which receives it.

5. The frame according to claim 1, wherein the welds connecting the ends of each bar to the inserts are substantially planar and wherein the inserts and the ends of the bars are flushed with the outer faces of the plates.

6. The frame according to claim 1, wherein the ends of each bar have threaded apertures, able to receive screws for attaching end flanges onto the plates.

7. A method for manufacturing a frame according to claim 1, comprising the following steps:
   providing two plates in cast iron, having an inner face and an outer face, and through-orifices receiving steel inserts;
   providing at least one bar in steel;
   welding the ends of each bar to one of the inserts of each of the plates.

8. The manufacturing method according to claim 7, wherein the inserts have a central through-conduit, the method comprising a step for inserting the ends of the bars into the central conduits of the inserts, without the end jutting out from the outer face of the plate.

9. The manufacturing method according to claim 8, wherein the ends of the bars has chamfered edges and wherein the central conduits of the inserts have a chamfered edge located on the side of the outer face of the plate, the chamfered edges and the chamfered edges forming a notch having a V-shaped section, a weld connecting each end of each bar to the insert which receives it being made in said notch.

10. The manufacturing method according to claim 9, comprising a step for piercing a threaded aperture in each end of each bar and a step for leveling the welds at the outer faces of the plates, by removing the excess material jutting out from the plates.

11. A motor stator frame comprising:
   two plates in cast iron;
   at least one bar in steel connecting both plates, the bar having two ends each attached to one of the plates;
   wherein each plate in cast iron has at least one orifice receiving an insert in steel, each insert receiving one of the ends of one of the bars, the frame comprising, for each insert, a weld located between said end of the bar and said insert, the weld maintaining said end engaged into said insert.

12. The frame according to claim 11, wherein each insert has a central conduit receiving the end of the bar, the end of the bar and the insert having respective chamfered edges, the chamfered edges forming notch, the weld being located in the notch.

* * * * *